Patented May 5, 1936

2,039,481

UNITED STATES PATENT OFFICE 2,039,481

REFINING OF NATURAL OLEORESIN

Ralph W. Frey, Mount Rainier, Md., and Wiley C. Smith, Clarendon, Va., assignors to Henry A. Wallace, Secretary of Agriculture of the United States of America No Drawing. Application September 28, 1935, Serial No. 42,574

14 Claims. (Cl. 87—2)

(Granted under the act of March 3, 1883, as amended April 30, 1928; 370 O. G. 757)

This application is made under the act of March 3, 1883, as amended by the act of April 30, 1928, and the invention herein described and claimed may be used by or for the Government for governmental purposes without the payment to us of any royalty thereon.

Our invention relates to the processing of oleoresins. It is particularly well adapted to the processing of the oleoresinous exudate of coniferous trees, whereby the exudate in a crude, semi-refined, or refined state, either with or without filtration, straining and washing, is subjected to distillation, usually with steam resulting in the driving off of turpentine and various other volatile constituents and leaving rosin and other less volatile matter as residue. The solid foreign matter, such as chips, bark, leaves, and coarser dirt in suspension in the molten rosin, is usually removed by straining the rosin before cooling. The finer particles of dirt pass through the strainer or filter and consequently remain in the finished rosin.

Our invention has for its ultimate object the production of rosin of improved grade by virtue of having less color and greater brilliancy, and of being essentially free from dirt, especially that recognized as fine red or brown specks. Our invention is applicable either in the refining or exudate prior to distillation or during distillation for the production of turpentine and rosin.

The oleoresinous exudate, as collected from the trees is contaminated with foreign matter of a varied nature comprising among other matter chips, leaves, bark, dirt, water, and water soluble constituents derived from the foregoing. Obviously much of the foreign matter is in a solid form in suspension and admixture with the exudate. Methods of refinement aimed at removal of such solid matter usually by mechanical means like filtration, straining, sedimentation, or decantation are well known. The particular feature of our invention is the removal of foreign constituents or contamination occurring in a soluble or colloidal form, chiefly in the water in the exudate, and which consequently cannot be separated therefrom and from the rosin by such means alone as filtration or straining.

Chief among these soluble foreign constituents are the tannins and closely related natural organic compounds. These are derived from the bark, leaves, and wood of the tree. Being soluble they are not removed from even an exudate refined by the usual methods and are consequently carried with the exudate into the still. Here at the comparatively high temperatures prevailing toward the last of the distillation these compounds are decomposed or polymerized resulting in the formation of dark colored products which discolor the rosin and also in the formation of fine carbonized and polymerized particles which appear as specks dispersed throughout the rosin, thereby reducing its brilliancy and grade. Treatment of the exudate either in its refinement before distillation or during its distillation, in accordance with our invention produces a brilliant rosin essentially free from such specks and lighter in color frequently by several grades than rosin ordinarily obtained.

According to our invention the oleoresin is brought into contact with a protein, preferably in a natural fibrous form, so tanned as to be insoluble and resistant to hydrolysis and comparatively high temperatures but yet reactive to the natural tannins and closely related organic compounds. Included among such tanned proteins are those tanned with compounds of chromium, aldehydes, and synthetic tanning materials known generically in the trade as syntans. By way of illustration but not in any degree a limitation of our invention, a readily available, non-expensive, commercial source of a suitably tanned protein is blue, chrome-stock leather waste. This material occurs as a waste from chrome leather tanneries in the form of shavings, shreddings, pieces, and trimmings, and is put up for marketing chiefly to the glue and fertilizer trade in convenient baled form. It is the waste product obtained from shaving and trimming hides and skins immediately after chrome tanning them and before they are dyed and fat-liquored, or oiled.

The tannins and closely related organic compounds present in the oleoresin readily combine with such tanned proteins to form insoluble and stable products and are thereby withdrawn from further reactions, which otherwise would result in their decomposition as previously described.

Our invention is especially adaptable to the refinement of oleoresins before distillation. The oleoresin, heated and thinned with turpentine or other thinner if desired, is brought into contact with a small quantity of the chrome leather waste, the quantity depending upon the condition of the oleoresin. Contact may be made either by intimate admixture with the oleoresin followed by filtration or straining, or by passage of the oleoresin through a layer or bed of the chrome leather waste.

Our invention may also be applied in the distillation of the oleoresin by adding the chrome leather waste directly to the charge of oleoresin in the still before actual distillation is started. The products formed through reaction with the chrome leather waste are stable even at the comparatively high temperatures of distillation and are subsequently removed as solid matter in the customary straining of the resin from the still.

The quantity of chrome leather waste will vary as already stated. Ordinarily only a small quantity of the order of from one to not more than five percent of the weight of the oleoresin will suffice.

A further obvious advantage of our invention is that its application does not require any special equipment in addition to that ordinarily used in refining and distilling oleoresin.

Having thus described our invention, what we claim for Letters Patent is:

1. The process of refining an oleoresin and the resin derived therefrom, which comprises contacting them with an insoluble, non-hydrolyzable, tanned protein that is reactive with the natural tannins and closely related organic compounds, and subsequently separating the reagent and its reaction products from the oleoresin and the resin derived therefrom.

2. The process of refining the oleoresinous exudate of coniferous trees and the resin derived therefrom, which comprises contacting them with an insoluble, non-hydrolyzable tanned protein that is reactive with the natural tannins and closely related organic compounds, and subsequently separating the reagent and its reaction products from the oleoresinous exudate and the resin derived therefrom.

3. The process of refining an oleoresin and the resin derived therefrom, which comprises contacting them with chrome tanned leather, and subsequently separating the leather and its reaction products from the oleoresin and the resin derived therefrom.

4. The process of refining the oleoresinous exudate of coniferous trees and the resin derived therefrom, which comprises contacting them with chrome tanned leather, and subsequently separating the leather and its reaction products from the oleoresinous exudate and the resin derived therefrom.

5. The process of refining an oleoresin and the resin derived therefrom, which comprises contacting them with aldehyde tanned leather, and subsequently separating the leather and its reaction products from the oleoresin and the resin derived therefrom.

6. The process of refining the oleoresinous exudate of coniferous trees and the resin derived therefrom, which comprises contacting them with aldehyde tanned leather, and subsequently separating the leather and its reaction products from the oleoresinous exudate and the resin derived therefrom.

7. The process of refining an oleoresin and the resin derived therefrom, which comprises contacting them with leather tanned with synthetic tanning materials, known generically as syntans, and subsequently separating the leather and its reaction products from the oleoresin and the resin derived therefrom.

8. The process of refining the oleoresinous exudate of coniferous trees and the resin derived therefrom, which comprises contacting them with leather tanned with synthetic tanning materials, known generically as syntans, and subsequently separating the leather and its reaction products from the oleoresinous exudate and the resin derived therefrom.

9. The process of refining an oleoresin and the resin derived therefrom, which comprises contacting them with a chrome tanned protein, and subsequently separating the reagent and its reaction products from the oleoresin and the resin derived therefrom.

10. The process of refining the oleoresinous exudate of coniferous trees and the resin derived therefrom, which comprises contacting them with a chrome tanned protein, and subsequently separating the reagent and its reaction products from the oleoresinous exudate and the resin derived therefrom.

11. The process of refining an oleoresin and the resin derived therefrom, which comprises contacting them with an aldehyde tanned protein, and subsequently separating the reagent and its reaction products from the oleoresin and the resin derived therefrom.

12. The process of refining the oleoresinous exudate of coniferous trees and the resin derived therefrom, which comprises contacting them with an aldehyde tanned protein, and subsequently separating the reagent and its reaction products from the oleoresinous exudate and the resin derived therefrom.

13. The process of refining an oleoresin and the resin derived therefrom, which comprises contacting them with a protein tanned with synthetic tanning materials, known generically as syntans, and subsequently separating the reagent and its reaction products from the oleoresin and the resin derived therefrom.

14. The process of refining the oleoresinous exudate of coniferous trees and the resin derived therefrom, which comprises contacting them with a protein tanned with synthetic tanning materials, known generically as syntans, and subsequently separating the reagent and its reaction products from the oleoresinous exudate and the resin derived therefrom.

RALPH W. FREY.
WILEY C. SMITH.